(12) United States Patent
Crocker et al.

(10) Patent No.: US 9,262,856 B1
(45) Date of Patent: Feb. 16, 2016

(54) PROVIDING CONTENT RESPONSIVE TO PERFORMANCE OF AVAILABLE ACTIONS SOLICITED VIA VISUAL INDICATIONS

(75) Inventors: John Crocker, Valencia, CA (US); Robert Todd Ogrin, Santa Clarita, CA (US); Jacob D. Wagaman, Toluca Lake, CA (US); Christian P. Shrigley, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 232 days.

(21) Appl. No.: 13/551,249

(22) Filed: Jul. 17, 2012

(51) Int. Cl.
  G06T 13/00 (2011.01)
  G06T 13/40 (2011.01)
  H04M 1/725 (2006.01)

(52) U.S. Cl.
  CPC ........... *G06T 13/40* (2013.01); *H04M 1/72544* (2013.01)

(58) Field of Classification Search
  USPC .......................................................... 463/42
  See application file for complete search history.

(56) References Cited

U.S. PATENT DOCUMENTS

| | | | | |
|---|---|---|---|---|
| 2008/0113698 A1* | 5/2008 | Egozy | ..................... | A63F 13/12 463/7 |
| 2008/0158232 A1* | 7/2008 | Shuster | ................... | G06T 13/40 345/474 |
| 2009/0069096 A1* | 3/2009 | Nishimoto | ..................... | 463/43 |
| 2009/0282472 A1* | 11/2009 | Hamilton, II | ....... | H04L 63/0428 726/15 |
| 2010/0164946 A1* | 7/2010 | Hyndman | ............... | G06T 13/40 345/419 |
| 2011/0054870 A1* | 3/2011 | Dariush et al. | ................... | 703/11 |
| 2011/0225519 A1* | 9/2011 | Goldman | .............. | G06F 3/0481 715/757 |
| 2012/0131478 A1* | 5/2012 | Maor | ..................... | G06T 11/60 715/757 |
| 2012/0302351 A1* | 11/2012 | Murphy et al. | ................. | 463/42 |
| 2013/0252216 A1* | 9/2013 | Clavin | ............... | G09B 19/0038 434/257 |

* cited by examiner

*Primary Examiner* — Phi Hoang

(74) *Attorney, Agent, or Firm* — Sheppard Mullin Richter & Hampton LLP

(57) ABSTRACT

Content may be provided within a virtual space responsive to user characters performing available actions solicited via visual indications within the virtual space. One or more available actions may be determined. A given available action may include an action that is available to be performed by one or more user characters within the virtual space. Individual ones of the one or more available actions may be solicited via visual indications of the respective available actions. Performance of individual available actions by one or more user characters may be effectuated responsive to one or more conditions being satisfied. Content may be presented in the virtual space responsive to performance of at least one of the available actions.

22 Claims, 2 Drawing Sheets

PROVIDING CONTENT RESPONSIVE TO PERFORMANCE OF AVAILABLE ACTIONS SOLICITED VIA VISUAL INDICATIONS

FIELD OF THE DISCLOSURE

This disclosure relates to providing content within a virtual space responsive to user characters performing available actions solicited via visual indications presented within the virtual space.

BACKGROUND

Emoticons in virtual spaces are known. In conventional approaches, emoticons typically allow players to express themselves via their corresponding user characters through a visual indication such as an animation or iconography.

SUMMARY

One aspect of the disclosure relates to a system configured to provide content within a virtual space responsive to user characters performing available actions solicited via visual indications within the virtual space, in accordance with one or more implementations. In exemplary implementations, a user may select an available action for their user character, such as a dance, high five, and/or other action, which may be represented by a visual indication soliciting the selected action to other users. A user character of another user may respond with a corresponding action responsive to the two user characters coming into proximity with each other. For example, the two user characters may begin to dance together or give each other a high five. The actions of the two user characters may be purely expressive having no real impact in the virtual space. The actions may be associated with specific content and/or a game mechanic of the virtual space. By way of non-limiting example, high fiving at a particular location in the virtual space may activate an object like opening a door. In some implementations, a group of two or more user characters may engage in a particular sequence of actions. This may enable group puzzle solving, activation of content, and/or other events based on group activity in the virtual space.

In some implementations, the system may include one or more servers. The server(s) may be configured to communicate with one or more client computing platforms according to a client/server architecture. The users may access the system and/or the virtual space via client computing the platform(s). The server(s) may be configured to execute one or more computer program modules. The computer program modules may include one or more of a user module, a space module, an action determination module, an action solicitation module, an action activation module, a content provisioning module, an action sequence module, and/or other modules. The user module may be configured to access and/or manage one or more user profiles and/or user information associated with users of the system. The space module may be configured to implement the instance of the virtual space executed by the computer modules to determine views of the virtual space.

The action determination module may be configured to determine one or more available actions. Generally speaking, an available action may include an action that is available to be performed by one or more user characters within the virtual space. Available actions may be determined based on various factors. An available action may be selected from a plurality of available actions. An available action may be determined based on user selection. By way of non-limiting example, a user may select a given available action from a list of available actions presented via client computing the platform(s). An available action may be determined based on a location of a user character within the virtual space. For example, if a user character is in a night club in the virtual space, a given available action may include dancing. An available action may be determined based on a geo-location of a user associated with a user character. By way of non-limiting example, if a user is located in a real-world coffee shop, a given available action may include sharing a cup of coffee. An available action may be determined based on an inventory of virtual items associated with a user character. For example, if an inventory includes a virtual bow and arrow, a given available action may be shooting an apple off of another user character's head.

The action solicitation module may be configured to solicit individual ones of the one or more available actions. In some implementations, a given available action may be solicited via a visual indication of the given available action. A visual indication of an available action may be associated with one or more user characters. For examples, a visual indication of an available action may include an animation of a user character, a change in appearance of a user character, an icon floating proximate to a user character, and/or other visual indications associated with one or more user characters. According to some implementations, a visual indication of an available action may be separate and distinct from any user characters. For example, a visual indication may be positioned on or near an object within the virtual space. In some implementations, a visual indication of an available action is not visible in the virtual space. A visual indication may be visible via a user interface that is associated with the virtual space and accessible by client computing the platform(s).

The action activation module may be configured to effectuate performance of individual ones of the one or more available actions by one or more user characters. Performance of a given available action may be effectuated responsive to a given condition being satisfied. By way of non-limiting example, a condition may be associated with a proximity between two or more user characters, a proximity between one or more user characters and a visual indication of an available action, a response to an invitation to perform an available action, and/or other conditions that may be satisfied to effectuate performance of one or more available actions.

The content provisioning module may be configured to present content in the virtual space responsive to performance of at least one of the available actions. Content may be associated with game mechanics of the virtual space. For example, content presented responsive to performance of an available action may facilitate gameplay. Content may be visual content in the virtual space. For example, user characters surrounding a fire pit in the virtual space may trigger the fire to start by performing one or more available actions. As another example, user characters in a throne room of a castle may trigger an appearance of a non-player character princess by performing one or more available actions.

The action sequence module may be configured to determine whether a series of actions were performed according to a given sequence. The given sequence may convey a specific order of performed actions. In some implementations, the content provisioning module may be configured to present first content responsive to performance of the series of actions in the given sequence. The action sequence module may determine other aspects of a performance of available actions such as, for example, a duration of a performance of an action, a degree that an action was performed, and/or other aspects.

The action solicitation module may be configured to provide prompts associated with the one or more available actions. A given prompt may be associated with a given available action providing a suggestion for satisfying an associated condition. A given prompt may be associated with a given sequence of actions providing a suggestion for satisfying one or more conditions associated with one or more available actions in the given sequence. In one example, a non-player character may make a gesture or remark providing a clue to users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
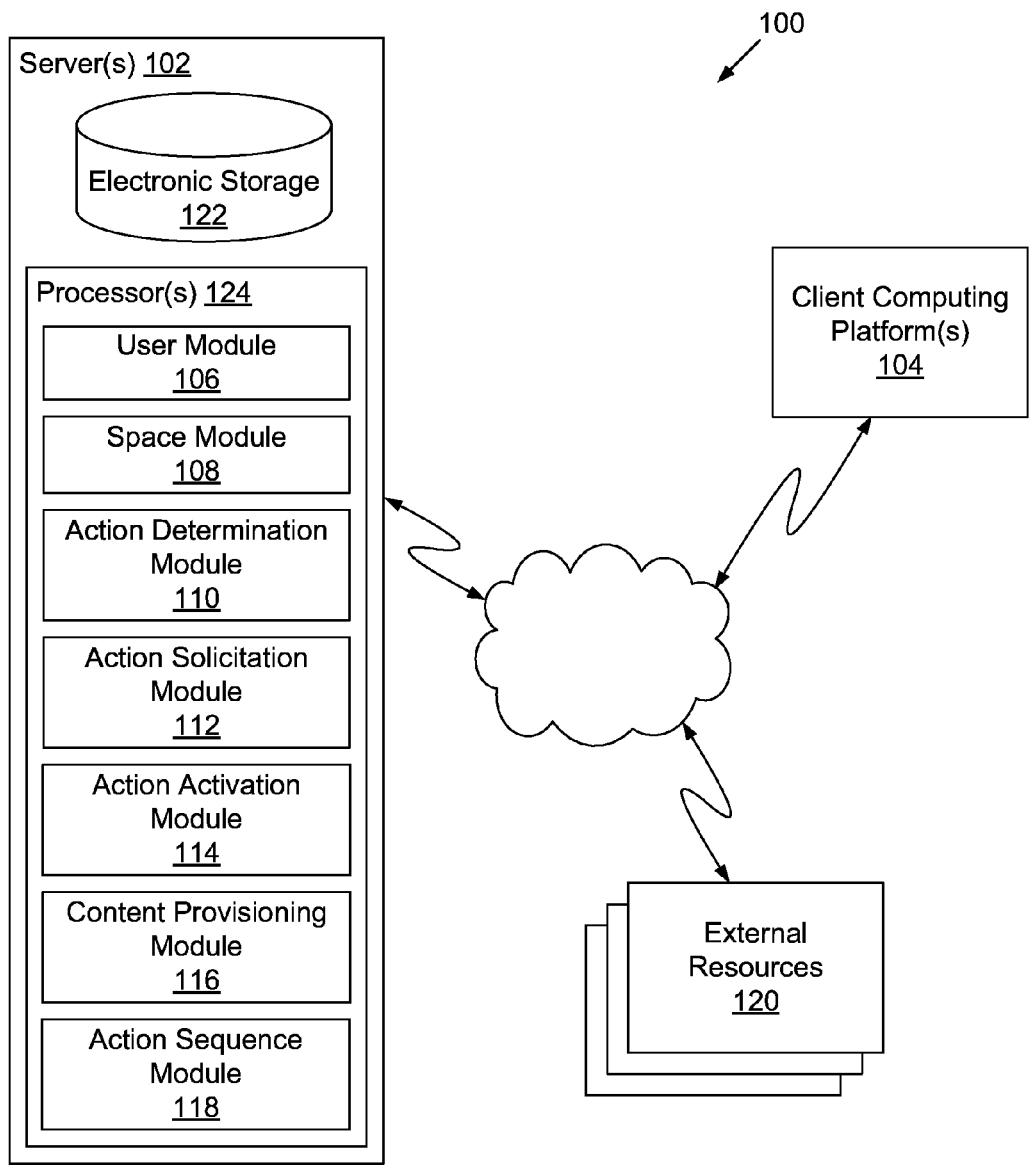
FIG. 1 illustrates a system configured to provide content within a virtual space responsive to user characters performing available actions solicited via visual indications within the virtual space, in accordance with one or more implementations.

FIG. 1 illustrates a system 100 configured to provide content within a virtual space responsive to user characters performing available actions solicited via visual indications within the virtual space, in accordance with one or more implementations. In exemplary implementations, a user may select an available action for their user character, such as a dance, high five, and/or other action, which may be represented by a visual indication soliciting the selected action to other users. A user character of another user may respond with a corresponding action responsive to the two user characters coming into proximity with each other. For example, the two user characters may begin to dance together or give each other a high five. The actions of the two user characters may be purely expressive having no real impact in the virtual space. The actions may be associated with specific content and/or a game mechanic of the virtual space. By way of non-limiting example, high fiving at a particular location in the virtual space may activate an object like opening a door. In some implementations, a group of two or more user characters may engage in a particular sequence of actions. This may enable group puzzle solving, activation of content, and/or other events based on group activity in the virtual space.

In some implementations, system 100 may include one or more servers 102. The server(s) 102 may be configured to communicate with one or more client computing platforms 104 according to a client/server architecture. The users may access system 100 and/or the virtual space via client computing platform(s) 104. The server(s) 102 may be configured to execute one or more computer program modules. The computer program modules may include one or more of a user module 106, a space module 108, an action determination module 110, an action solicitation module 112, an action activation module 114, a content provisioning module 116, an action sequence module 118, and/or other modules.

The user module 106 may be configured to access and/or manage one or more user profiles and/or user information associated with users of system 100. The one or more user profiles and/or user information may include information stored by server(s) 102, one or more of client computing platform(s) 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 108 may be configured to implement the instance of the virtual space executed by the computer modules to determine views of the virtual space. The views may then be communicated (e.g., via streaming, via object/position data, and/or other information) from server(s) 102 to client computing platform(s) 104 for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 108 is not intended to be limiting. The space module 108 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 104. The users may interact with each other through communications exchanged within the virtual space. Such communications may include one or more of textual chat, instant messages, private messages, voice communications, and/or other communications. Communications may be received and entered by the users via their respective client computing platform(s) 104. Communications may be routed to and from the appropriate users through server(s) 102 (e.g., through space module 108).

The action determination module 110 may be configured to determine one or more available actions. Generally speaking, an available action may include an action that is available to be performed by one or more user characters within the virtual space. Available actions may be determined based on various factors. An available action may be selected from a plurality of available actions. An available action may be determined based on user selection. By way of non-limiting example, a user may select a given available action from a list of available actions presented via client computing platform(s) 104. An available action may be determined based on a location of a user character within the virtual space. For example, if a user character is in a night club in the virtual space, a given available action may include dancing. An available action may be determined based on a geo-location of a user associated with a user character. By way of non-limiting example, if a user is located in a real-world coffee shop, a given available action may include sharing a cup of coffee. An available action may be determined based on an inventory of virtual items associated with a user character. For example, if an inventory includes a virtual bow and arrow, a given available action may be shooting an apple off of another user character's head.

The action solicitation module 112 may be configured to solicit individual ones of the one or more available actions. In some implementations, a given available action may be solicited via a visual indication of the given available action. A visual indication of an available action may be associated with one or more user characters. For examples, a visual indication of an available action may include an animation of a user character, a change in appearance of a user character, an icon floating proximate to a user character, and/or other visual indications associated with one or more user characters. According to some implementations, a visual indication of an available action may be separate and distinct from any user characters. For example, a visual indication may be positioned on or near an object within the virtual space. In some implementations, a visual indication of an available action is not visible in the virtual space. A visual indication may be visible via a user interface that is associated with the virtual space and accessible by client computing platform(s) 104.

The action activation module 114 may be configured to effectuate performance of individual ones of the one or more available actions by one or more user characters. Performance of a given available action may be effectuated responsive to a given condition being satisfied. By way of non-limiting example, a condition may be associated with a proximity between two or more user characters, a proximity between one or more user characters and a visual indication of an available action, a response to an invitation to perform an available action, and/or other conditions that may be satisfied to effectuate performance of one or more available actions.

Performance of a given available action may be inconsequential in the virtual space, or performance of the given action may be associated with specific content and/or a game mechanic of the virtual space. In some implementations, two or more user characters may synchronously and/or sequentially perform one or more available actions. According to one non-limiting example, if a user wants their user character to high five another user character, knowing that doing so result in fireworks being set off, the user may select a high five from one or more available actions. A visual indication, such as an icon representing a high five, may be positioned above the first user character. Other users may be able to see that the first user character wants to do a high five via the visual indication. A second user may also select a high five from the available actions and control their user character to approach the first user character. As a result, the two user characters may share a high five triggering fireworks to be set off.

The content provisioning module 116 may be configured to present content in the virtual space responsive to performance of at least one of the available actions. Content may be associated with game mechanics of the virtual space. For example, content presented responsive to performance of an available action may facilitate gameplay. Content may be visual content in the virtual space. For example, user characters surrounding a fire pit in the virtual space may trigger the fire to start by performing one or more available actions. As another example, user characters in a throne room of a castle may trigger an appearance of a non-player character princess by performing one or more available actions.

The action sequence module 118 may be configured to determine whether a series of actions were performed according to a given sequence. The given sequence may convey a specific order of performed actions. In some implementations, content provisioning module 116 may be configured to present first content responsive to performance of the series of actions in the given sequence. The action sequence module 118 may determine other aspects of a performance of available actions such as, for example, a duration of a performance of an action, a degree that an action was performed, and/or other aspects.

The action solicitation module 112 may be configured to provide prompts associated with the one or more available actions. A given prompt may be associated with a given available action providing a suggestion for satisfying an associated condition. A given prompt may be associated with a given sequence of actions providing a suggestion for satisfying one or more conditions associated with one or more available actions in the given sequence. In one example, a non-player character may make a gesture or remark providing a clue to users.

To illustrate one or more exemplary implementations, one or more gameplay rules may be established that specify one or more of a minimum number of players required, one or more available actions for the gameplay, a sequence in which the available actions are to be performed, a time limit for performing the available actions, a geo-location of users associated with user characters, and/or other rules. User characters may find activation areas in the virtual space, such as a totem pole with one or more visual indications of available actions thereon. As user characters approach the totem pole, they may become participants of the gameplay. A visual element may communicate to participating user characters that they have engaged in a collective gameplay event. As the user character select different visual indications from the totem pole, visual clues may guide them toward the correct choices and/or sequences. Responsive to the participating user characters performing the available actions in the prescribed sequence, content may be activated and/or the user characters maybe rewarded.

In some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

The server(s) 102 may include electronic storage 122, one or more processors 124, and/or other components. The server (s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. The processor(s) 104 may be configured to execute modules 106, 108, 110, 112, 114, 116, 118, and/or other modules. The processor(s) 124 may be configured to execute modules 106, 108, 110, 112, 114, 116, 118, and/or other modules by software; hardware; firmware; some combination of software, hardware, and/or firmware; and/or other mechanisms for configuring processing capabilities on processor(s) 124.

It should be appreciated that although modules 106, 108, 110, 112, 114, 116, and 118 are illustrated in FIG. 1 as being co-located within a single processing unit, in implementations in which processor(s) 124 includes multiple processing units, one or more of modules 106, 108, 110, 112, 114, 116, and/or 118 may be located remotely from the other modules. The description of the functionality provided by the different modules 106, 108, 110, 112, 114, 116, and/or 118 described herein is for illustrative purposes, and is not intended to be limiting, as any of modules 106, 108, 110, 112, 114, 116, and/or 118 may provide more or less functionality than is described. For example, one or more of modules 106, 108, 110, 112, 114, 116, and/or 118 may be eliminated, and some or all of its functionality may be provided by other ones of modules 106, 108, 110, 112, 114, 116, and/or 118. As another example, processor(s) 124 may be configured to execute one or more additional modules that may perform some or all of the functionality attributed below to one of modules 106, 108, 110, 112, 114, 116, and/or 118.

Figure 2:
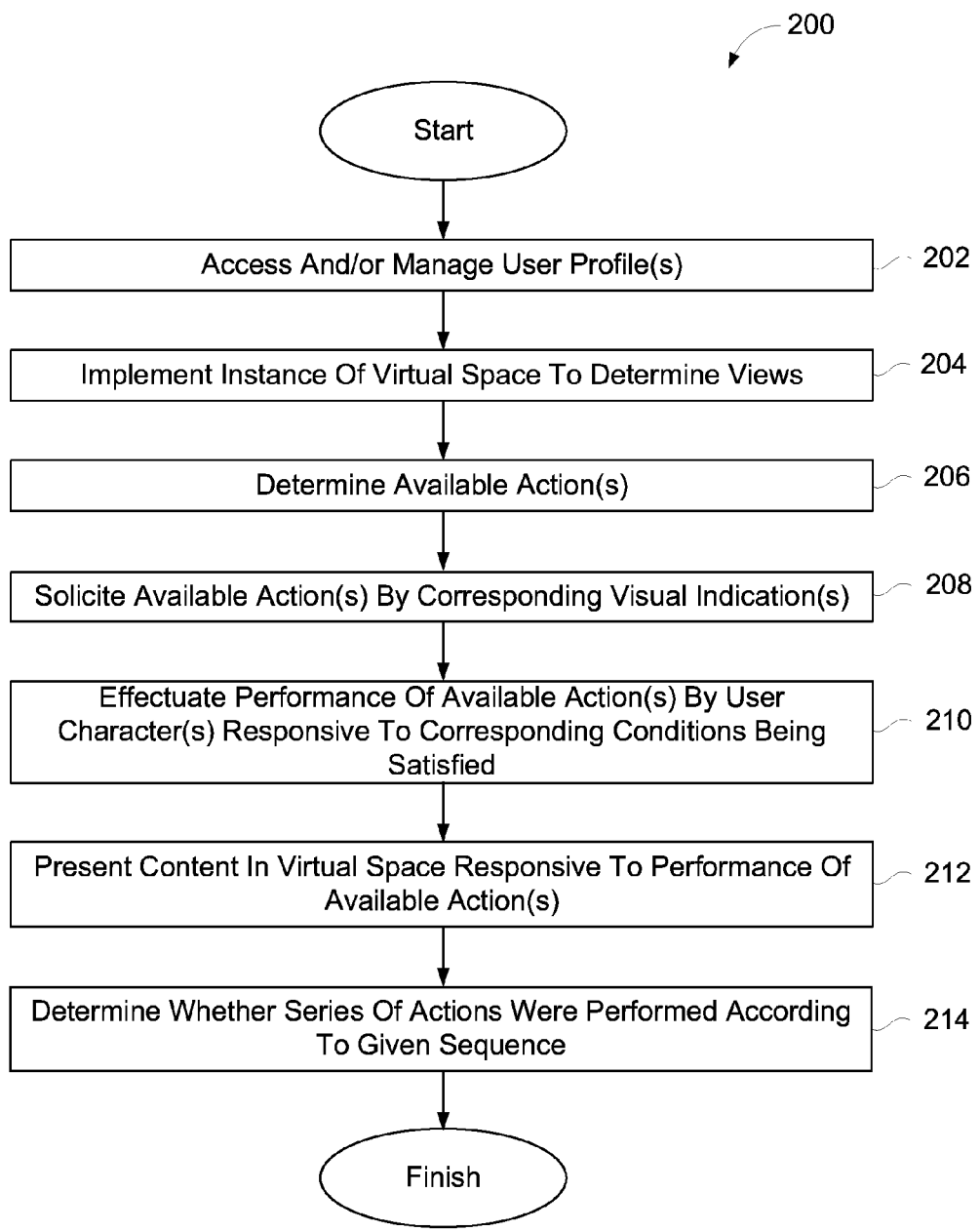
FIG. 2 illustrates a method for providing content within a virtual space responsive to user characters performing available actions solicited via visual indications within the virtual space, in accordance with one or more implementations.

FIG. 2 illustrates a method 200 for providing content within a virtual space responsive to user characters performing available actions solicited via visual indications within the virtual space, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, one or more user profiles may be accessed and/or managed. Operation 202 may be performed by a user module that is the same as or similar to user module 106, in accordance with one or more implementations.

At an operation 204, an instance of a virtual space may be implemented to determine views of the virtual space. Operation 204 may be performed by a space module that is the same as or similar to space module 108, in accordance with one or more implementations.

At an operation 206, one or more available actions may be determined. Operation 206 may be performed by an action determination module that is the same as or similar to action determination module 110, in accordance with one or more implementations.

At an operation 208, individual ones of the one or more available actions may be solicited by corresponding visual indications. Operation 208 may be performed by an action solicitation module that is the same as or similar to action solicitation module 112, in accordance with one or more implementations.

At an operation 210, performance of individual ones of the one or more available actions by one or more user characters may be effectuated responsive to corresponding conditions being satisfied. Operation 210 may be performed by an action activation module that is the same as or similar to action activation module 114, in accordance with one or more implementations.

At an operation 212, content may be presented in the virtual space responsive to performance of at least one of the available actions. Operation 212 may be performed by a content provisioning module that is the same as or similar to content provisioning module 116, in accordance with one or more implementations.

At an operation 214, a determination may be made as to whether a series of actions were performed according to a given sequence. Operation 214 may be performed by an action sequence module that is the same as or similar to action sequence module 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide content within a virtual space responsive to user characters performing available actions solicited via visual indications within the virtual space, the system comprising:
   one or more physical processors configured by machine-readable instructions to:
      determine available actions in a shared series of actions including a first available action, a second available action, and a third available action, individual ones of the available actions in the shared series of actions being available to be performed by one or more user characters within the virtual space, such that the shared series of actions is available to be performed by a first user character and a second user character;
      solicit the first available action via a first visual indication of the first available action, the first visual indication being presented within the virtual space;
      effectuate performance of the first available action by one or both of the first user character or the second user character, performance of the first available action being effectuated responsive to a first condition being satisfied;
      solicit the second available action via a second visual indication of the second available action, the second visual indication being presented within the virtual space;
      effectuate performance of the second available action by one or both of the first user character or the second user character, performance of the second available action being effectuated responsive to a second condition being satisfied;
      solicit the third available action via a third visual indication of the third available action, the third visual indication being presented within the virtual space;
      effectuate performance of the third available action by one or both of the first user character or the second user character, performance of the third available action being effectuated responsive to a third condition being satisfied;
      determine whether the shared series of actions including the first available action, the second available action, and the third available action were performed according to a given sequence by the first user character and the second user character, such that the first user character performed at least one of the first available action, the second available action, or the third available action, and the second user character performed at least one of the first available action, the second available action, or the third available action; and
      present content in the virtual space responsive to a positive determination that the shared series of actions including the first available action, the second available action, and the third available action, were performed according to the given sequence.

2. The system of claim 1, wherein the one or more physical processors are further configured by machine-readable instructions to determine the first available action based on one or more of a user selection, a location of a user character within the virtual space, a geo-location of a user associated with a user character, or an inventory of virtual items associated with a user character.

3. The system of claim 1, wherein the first visual indication includes one or more of an animation of a user character, a change in appearance of a user character, or an icon.

4. The system of claim 1, wherein the first visual indication is presented proximate to a user character to which the first available action is available.

5. The system of claim 1, wherein the first condition is associated with a proximity between two or more user characters.

6. The system of claim 1, wherein performance of the first available action is inconsequential in the virtual space.

7. The system of claim 1, wherein the one or more physical processors are further configured by machine-readable instructions to present first content responsive to performance of the first available action.

8. The system of claim 1, wherein the one or more physical processors are further configured by machine-readable instructions to provide prompts associated with the one or more available actions, a given prompt associated with the first available action providing a suggestion for satisfying the first condition.

9. The system of claim 1, wherein the first condition is associated with a response to an invitation.

10. The system of claim 1, wherein performing the series of actions according to the given sequence includes the first user character and the second user character both performing at least one of the first available action, the second available action, or the third available action contemporaneously.

11. The system of claim 1, wherein performing the series of actions according to the given sequence includes the first user character performing at least the first available action, the second user character performing at least the second available action, and one or both of the first user character or the second user character performing the third available action, according to a particular order.

12. A computer-implemented method of providing content within a virtual space responsive to user characters performing available actions solicited via visual indications within the virtual space, the method being implemented in a computer system comprising one or more physical processors and storage media storing machine-readable instructions, the method comprising:

determining available actions in a shared series of actions including a first available action, a second available action, and a third available action, individual ones of the available actions in the shared series of actions being available to be performed by one or more user characters within the virtual space, such that the shared series of actions is available to be performed by a first user character and a second user character;

soliciting the first available action via a first visual indication of the first available action, the first visual indication being presented within the virtual space;

effectuating performance of the first available action by one or both of the first user character or the second user character, performance of the first available action being effectuated responsive to a first condition being satisfied;

soliciting the second available action via a second visual indication of the second available action, the second visual indication being presented within the virtual space;

effectuating performance of the second available action by one or both of the first user character or the second user character, performance of the second available action being effectuated responsive to a second condition being satisfied;

soliciting the third available action via a third visual indication of the third available action, the third visual indication being presented within the virtual space;

effectuating performance of the third available action by one or both of the first user character or the second user character, performance of the third available action being effectuated responsive to a third condition being satisfied;

determining whether the shared series of actions including the first available action, the second available action, and the third available action were performed according to a given sequence by the first user character and the second user character such that the first user character performed at least one of the first available action, the second available action, or the third available action, and the second user character performed at least one of the first available action, the second available action, or the third available action; and presenting content in the virtual space responsive to a positive determination that the shared series of actions including the first available action, the second available action, and the third available action were performed according to the given sequence.

13. The method of claim 12, wherein determining the first available action is based on one or more of a user selection, a location of a user character within the virtual space, a geo-location of a user associated with a user character, or an inventory of virtual items associated with a user character.

14. The method of claim 12, wherein the first visual indication includes one or more of an animation of a user character, a change in appearance of a user character, or an icon.

15. The method of claim 12, wherein the first visual indication is presented proximate to a user character to which the first available action is available.

16. The method of claim 12, wherein the first condition is associated with a proximity between two or more user characters.

17. The method of claim 12, wherein performance of the first available action is inconsequential in the virtual space.

18. The method of claim 12, further comprising presenting first content responsive to performance of the first available action.

19. The method of claim 12, further comprising providing prompts associated with the one or more available actions, a given prompt associated with the first available action providing a suggestion for satisfying the first condition.

20. The method of claim 12, wherein the first condition is associated with a response to an invitation.

21. The method of claim 12, wherein performing the series of actions according to the given sequence includes the first user character and the second user character both performing at least one of the first available action, the second available action, or the third available action contemporaneously.

22. The method of claim 12, wherein performing the series of actions according to the given sequence includes the first user character performing at least the first available action, the second user character performing at least the second available action, and one or both of the first user character or the second user character performing the third available action, according to a particular order.

* * * * *